US012404163B2

(12) United States Patent
Kang

(10) Patent No.: US 12,404,163 B2
(45) Date of Patent: Sep. 2, 2025

(54) WATER DISCHARGE UNIT AND WATER PURIFIER INCLUDING SAME

(71) Applicant: SAMSUNG ELECTRONICS CO., LTD., Suwon-si (KR)

(72) Inventor: Wanku Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 273 days.

(21) Appl. No.: 18/208,972

(22) Filed: Jun. 13, 2023

(65) Prior Publication Data

US 2023/0322542 A1 Oct. 12, 2023

Related U.S. Application Data

(63) Continuation of application No. PCT/KR2022/000240, filed on Jan. 6, 2022.

(30) Foreign Application Priority Data

Feb. 23, 2021 (KR) ........................ 10-2021-0024385

(51) Int. Cl.
*F21V 33/00* (2006.01)
*B67D 1/08* (2006.01)
(Continued)

(52) U.S. Cl.
CPC ......... *B67D 1/0872* (2013.01); *B67D 1/0888* (2013.01); *E03C 1/0404* (2013.01); (Continued)

(58) Field of Classification Search
CPC .... F21V 33/004; F21V 33/006; E03C 1/0404; B67D 2210/0001
See application file for complete search history.

(56) References Cited

U.S. PATENT DOCUMENTS 6,439,472 B1 8/2002 Lin et al.
11,549,243 B2 1/2023 Jeong et al.
(Continued)

FOREIGN PATENT DOCUMENTS

CN 105508659 A * 4/2016 ............ F16K 11/072
CN 109882629 A 6/2019
(Continued)

OTHER PUBLICATIONS

International Search Report issued in PCT/KR2022/00240 on May 12, 2022.

(Continued)

*Primary Examiner* — Zheng Song
(74) *Attorney, Agent, or Firm* — STAAS & HALSEY LLP

(57) ABSTRACT

A water purifier including a water discharge unit configured so that purified, cold, and hot water are selectably dischargeable therethrough, the water discharge unit including a rotatable body, a water discharge tube having a changeable position according to rotation of the body, and a display device including a first and a second light source, a light guide cover, and a guide case to guide light emitted from the first and second light source so as to be incident on the light guide cover, and to prevent mixing of the light from the first and the second light sources. The light guide cover projects the light from the first light source in a direction of water discharge from the water discharge tube, and projects the light from the second light source toward an outer peripheral surface of the display device to indicate which of purified, cold, and hot water is selected.

15 Claims, 13 Drawing Sheets

(51) Int. Cl.

| | |
|---|---|
| ***E03C 1/04*** | (2006.01) |
| ***F21V 19/00*** | (2006.01) |
| ***F21V 23/04*** | (2006.01) |

(52) U.S. Cl.

CPC ........ *F21V 19/006* (2013.01); *F21V 23/0471* (2013.01); *F21V 33/006* (2013.01); *B67D 2210/0001* (2013.01); *E03C 2201/40* (2013.01)

(56) References Cited

U.S. PATENT DOCUMENTS

| | | | | |
|---|---|---|---|---|
| 2006/0289343 | A1* | 12/2006 | Schmitt | E03C 1/04 137/553 |
| 2007/0199886 | A1 | 8/2007 | Korb et al. | |
| 2010/0213398 | A1 | 8/2010 | Brunner et al. | |
| 2013/0100650 | A1 | 4/2013 | Beregszaszi | |
| 2016/0146358 | A1* | 5/2016 | Lin | E03C 1/04 137/636.4 |
| 2021/0000289 | A1 | 1/2021 | Krüger et al. | |

FOREIGN PATENT DOCUMENTS

| | | | | |
|---|---|---|---|---|
| CN | 111386060 | A | 7/2020 | |
| DE | 20 2006 012 383 | U1 | 1/2008 | |
| EP | 3 760 795 | A1 | 1/2021 | |
| JP | 07-42211 | | 2/1995 | |
| JP | 2001-123485 | | 5/2001 | |
| JP | 2002-294775 | | 10/2002 | |
| JP | 2003-064743 | | 3/2003 | |
| JP | 4342894 | | 7/2009 | |
| JP | 4360092 | | 8/2009 | |
| KR | 20-0237689 | | 10/2001 | |
| KR | 10-1146626 | | 5/2012 | |
| KR | 10-2012-0076945 | | 7/2012 | |
| KR | 10-1459498 | | 11/2014 | |
| KR | 10-1633929 | | 6/2016 | |
| KR | 10-2016-0077017 | | 7/2016 | |
| KR | 10-1808831 | | 12/2017 | |
| KR | 10-2018-0063657 | | 6/2018 | |
| KR | 10-1901614 | | 9/2018 | |
| KR | 10-1902386 | | 10/2018 | |
| KR | 10-2019-0065848 | | 6/2019 | |
| KR | 10-2020-0133315 | | 11/2020 | |
| WO | WO-9105114 | A1 * | 4/1991 | E03C 1/0404 |
| WO | WO-2006072399 | A1 * | 7/2006 | E03C 1/0404 |
| WO | WO 2013/062511 | A1 | 5/2013 | |

OTHER PUBLICATIONS

Extended European Search Report dated Apr. 19, 2024 for European Application No. 22759894.3.

* cited by examiner

WATER DISCHARGE UNIT AND WATER PURIFIER INCLUDING SAME

CROSS-REFERENCE TO RELATED APPLICATIONS

This application is a continuation application under 35 U.S.C. § 111(a) of international Application No. PCT/KR2022/000240, filed on Jan. 6, 2022, which claims priority to Korean Patent Application No. 10-2021-0024385, filed on Feb. 23, 2021, the disclosures of which are incorporated by reference herein in their entireties.

BACKGROUND

1. Field

The present disclosure relates to a water discharge unit and a water purifier including the same, and more particularly, to a water purifier equipped with a display device.

2. Description of the Related Art

A water purifier is a device that provides drinking water to a user by removing harmful substances contained in raw water such as tap water or groundwater through various water purification methods such as precipitation, filtration, and sterilization. The water purifier is provided to supply clean water to the user by one or more water purification filters filtering the water introduced thereinto.

When classified based on form, water purifiers may be classified into a direct connection type in which the water purifier is directly connected to a faucet and a storage type in which water is held in a container and caused to pass through a filter, and when classified according to the water purification principle or method, water purifiers may be classified into a natural filtration type, a direct filtration type, an ion exchange resin type, a distillation type, and a reverse osmosis type.

In the direct filtration type water purifier, the water purifier is directly connected to a water pipe, and as water passes through a filter due to water pressure, impurities are filtered from the water. The water purified in this way may be discharged through a faucet and used as drinking water. The faucet may also be referred to as a water discharge unit.

In the direct filtration type water purifier, a main body in which the filter is embedded may be disposed in a space under a sink, and the faucet may be provided in the sink. This type of water purifier is referred to as an under-sink water purifier.

In many cases, the faucet of the under-sink water purifier is provided to rotate to promote user convenience by enabling the position of a water discharge hole to be changed. In this case, due to a change in the position of the water discharge hole, it may be difficult for the user to intuitively recognize the position of water discharge.

Also, there is a need for a user, who is washing dishes or cooking, to be able to immediately obtain information on water currently being discharged from a faucet without keeping an eye on a display of the faucet.

SUMMARY

Aspects of embodiments of the disclosure will be set forth in part in the description which follows and, in part, will be apparent from the description, or may be learned by practice of the presented embodiments.

According to an embodiment of the disclosure, a water purifier includes a main body arrangeable in a lower space of a cabinet; and a water discharge unit connected to the main body so that, when the main body is arranged in the lower space of the cabinet, at least a portion of the water discharge unit is exposed to an upper side of the cabinet, and purified water, cold water, and hot water are selectably dischargeable through the water discharge unit, wherein the water discharge unit includes a body configured to be rotatable, a water discharge tube having a position that is changeable according to rotation of the body, and a display device including a first light source, a second light source, a light guide cover, and a guide case configured to guide light emitted from the first light source and light emitted from the second light source so as to be incident on the light guide cover, and to prevent the light emitted from the first light source from being mixed with the light emitted from the second light source, wherein the light guide cover is configured to project the light emitted from the first light source and incident on the light guide cover in a direction of water discharge from the water discharge tube to indicate the direction of water discharge, and project the light emitted from the second light source and incident on the light guide cover toward an outer peripheral surface of the display device to indicate which of purified water, cold water, and hot water is selected.

According to an embodiment of the disclosure, the guide case and the light guide cover surround the water discharge tube.

According to an embodiment of the disclosure, the guide case includes a first guide hole configured to guide the light emitted from the first light source so as to be incident on the light guide cover, and a second guide hole spaced apart from the first guide hole and configured to guide the light emitted from the second light source so as to be incident on the light guide cover.

According to an embodiment of the disclosure, the display device includes a diffusion space formed between the guide case and the light guide cover, and partitioned from the first guide hole, the diffusion space being configured to communicate with the second guide hole, and the light guide cover includes a sidewall portion having an inner peripheral surface configured to form the diffusion space, and a light-emitting rib configured to protrude from an outer peripheral surface of the sidewall portion so as to be exposed to the outer peripheral surface of the display device.

According to an embodiment of the disclosure, the light guide cover projects the light emitted from the second light source, which is guided to the diffusion space and is incident on an inner peripheral surface of the light guide cover, through the light-emitting rib.

According to an embodiment of the disclosure, the light guide cover includes a bottom wall portion configured to form a lower surface of the display device and cover a lower end of the first guide hole, and the light emitted from the first light source guided by the first guide hole and incident on the light guide cover passes through the bottom wall portion and is projected in the direction of water discharge.

According to an embodiment of the disclosure, the light guide cover includes a lens provided on the bottom wall portion at a position corresponding to the first guide hole and configured to condense the light emitted from the first light source and incident on the light guide cover that is guided by the first guide hole.

According to an embodiment of the disclosure, the display device further includes a light shielding member disposed on the bottom wall portion to prevent the light emitted from the second light source and incident on the light guide cover from passing through the bottom wall portion.

According to an embodiment of the disclosure, the guide case includes a leakage reducing curved surface formed on an upper end of the first guide hole to allow the first light source to be seated in the leakage reducing curved surface, and configured to reduce leakage of the light emitted from the first light source.

According to an embodiment of the disclosure, the water discharge unit further includes a detecting sensor configured to detect an approach of a user, and a controller configured to control the detecting sensor, the first light source, and the second light source, and, in response to the detecting sensor detecting the approach of the user, the controller turns on the first light source.

According to an embodiment of the disclosure, the second light source emits rays of light of a plurality of different colors, and, in response to any one of the purified water, cold water, and hot water being selected, the controller controls the second light source to emit light of a color, among the plurality of different colors, corresponding to the selection of any one of the purified water, cold water, and hot water.

According to an embodiment of the disclosure, the water discharge unit includes a display configured to output an image, and, in response to the detecting sensor detecting the approach of the user, the controller turns on the display as well as the first light source.

According to an embodiment of the disclosure, the light guide cover includes a coupling hook extending upward so as to be fastenable to the guide case to couple the light guide cover to the guide case.

According to an embodiment of the disclosure, the guide case forms a hollow portion through which the water discharge tube passes.

According to an embodiment of the disclosure, the cabinet includes a sink, and when the main body is arranged in the lower space of the cabinet, the body of the water discharge unit is couplable to the sink so as to be rotatable.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
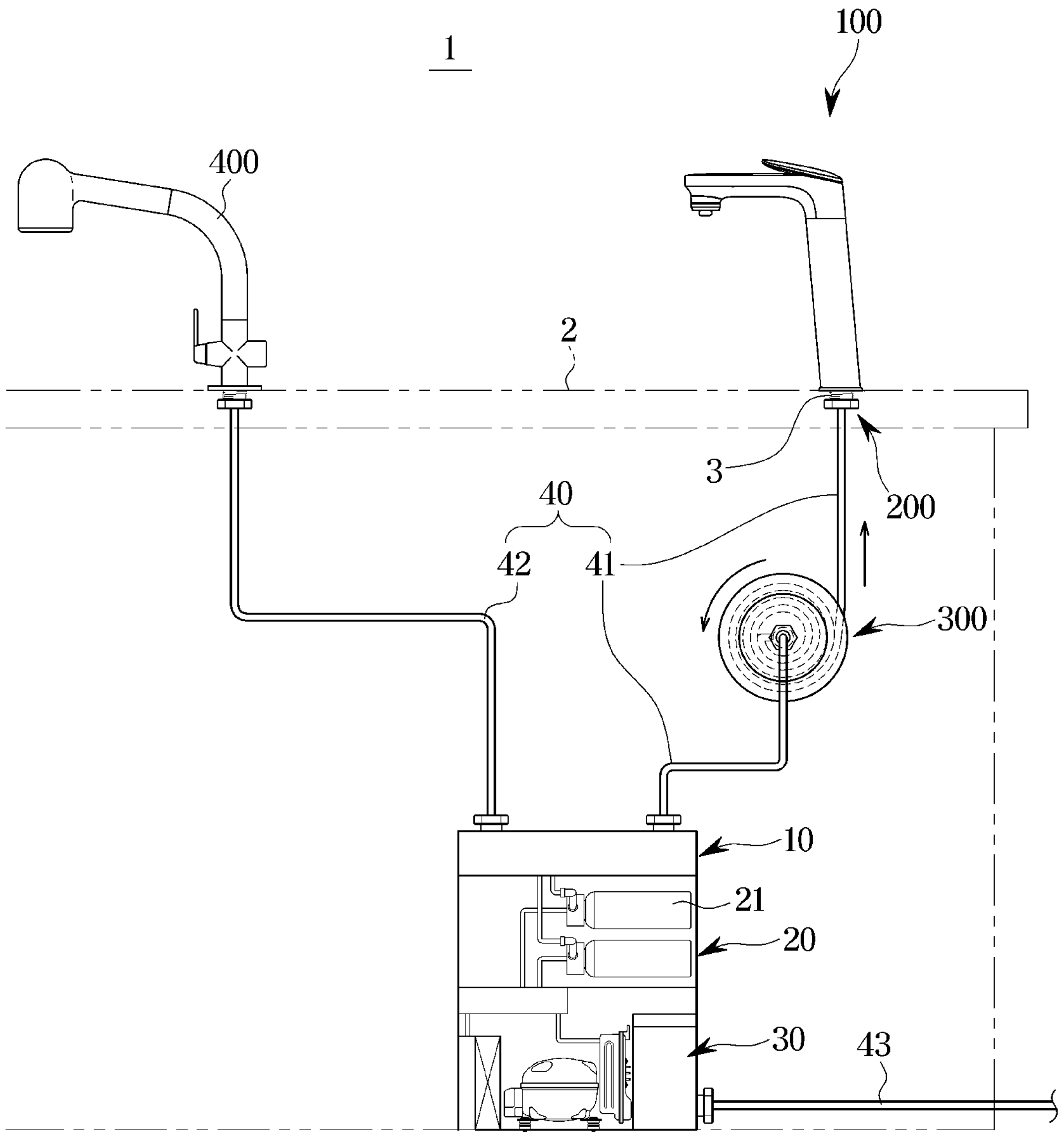
FIG. 1 is a view schematically illustrating a water purifier according to an embodiment of the disclosure.

Embodiments described herein and configurations illustrated in the drawings are merely exemplary embodiments of the present disclosure, and various modifications which may replace the embodiments and the drawings herein may be present at the time of filing this application.

Also, like reference numerals or symbols presented in the drawings of the application indicate parts or elements that perform substantially the same functions.

Also, terms used herein are for describing the embodiments and are not intended to limit and/or restrict the disclosure. A singular expression includes a plural expression unless context clearly indicates otherwise. In the application, terms such as "include" or "have" are for designating that features, numbers, steps, operations, elements, parts, or combinations thereof are present, and do not preclude the possibility of presence or addition of one or more other features, numbers, steps, operations, elements, parts, or combinations thereof in advance.

Also, terms including ordinals such as "first" and "second" used herein may be used to describe various elements, but the elements are not limited by the terms, and the terms are only used for the purpose of distinguishing one element from another element. For example, a first element may be referred to as a second element while not departing from the scope of rights of the present disclosure, and likewise, a second element may also be referred to as a first element. The term "and/or" includes a combination of a plurality of associated listed items or any one item among the plurality of associated listed items.

Meanwhile, terms such as "upward," "downward," "front end," and "rear end" used in the following description are defined based on the drawings, and the shape and position of each element are not limited by the terms.

Embodiments of the present disclosure may provide a water discharge unit which can provide pieces of information on water being discharged, and a water purifier including the same.

According to example embodiments of the present disclosure, a water discharge unit may use light to make a user recognize a position to which water will be discharged.

According to example embodiments of the present disclosure, a water discharge unit can use light to notify a user of information on a user's selection.

According to an example embodiment of the present disclosure, a plurality of indicators configured to provide pieces of different information using light can be provided in a single device, and thus, while size reduction is promoted, rays of light of the plurality of indicators can be clearly recognized by the user without being mixed with each other.

FIG. 1 is a view schematically illustrating a water purifier according to one embodiment of the present disclosure.

Referring to FIG. 1, a water purifier 1 may include a water purifier main body (or "main body") 10 and a water discharge unit 100 connected to the water purifier main body 10 and configured to discharge water to an outside of the water purifier main body 10. The water purifier main body 10 may be disposed in a lower space of a cabinet, such as a kitchen cabinet 2, and the water discharge unit 100 may be disposed so that at least a portion is exposed to an upper portion of the kitchen cabinet 2. The kitchen cabinet 2 may include a sink. The sink may include a sink and a kitchen countertop. The water discharge unit 100 may be referred to as a faucet.

The water discharge unit 100 may be installed on an upper portion of the kitchen cabinet 2. The water discharge unit 100 may be installed on an upper portion of the sink. The water discharge unit 100 may be rotatably provided on the upper portion of the kitchen cabinet 2. The water discharge unit 100 may be connected to the water purifier main body 10 through connecting members 40.

The water purifier main body 10 may be disposed inside the kitchen cabinet 2. The water purifier main body 10 may include a filter unit 20 including at least one or more filters 21 and a heat exchange unit 30 provided to cool or heat water purified by the filter unit 20. Although not illustrated, the heat exchange unit 30 may include a heater and a refrigeration cycle device which includes a compressor, a condenser, an expansion valve, and an evaporator.

The water purifier main body 10 may receive raw water such as tap water through an external pipe 43.

The connecting members 40 connected to the water purifier main body 10 may include a first pipe 41 connected to the water discharge unit 100 and a second pipe 42 connected to a faucet 400 installed in the kitchen cabinet 2. The first pipe 41 may include a plurality of first pipes 41.

An installation site 3 for installation of the water discharge unit 100 may be provided in the kitchen cabinet 2. The installation site 3 may be formed by at least a portion of the kitchen cabinet 2 being open. The first pipe 41 and the water discharge unit 100 may be connected through the installation site 3 of the kitchen cabinet 2.

The water discharge unit 100 may be rotatably installed at the installation site 3. The water purifier 1 may include a rotating device 200 configured to rotatably install the water discharge unit 100 at the installation site 3. The rotating device 200 may be coupled to the kitchen cabinet 2.

The water purifier 1 may include a pipe fixing device 300 provided to fix the pipes 40. The pipe fixing device 300 may be disposed inside the kitchen cabinet 2. The pipe fixing device 300 may be disposed between the water purifier main body 10 and the water discharge unit 100. The pipe fixing device 300 may be fixed to at least any one of the water purifier main body 10 and the water discharge unit 100. A portion of the pipes 40 may be wound around the pipe fixing device 300, and a length of the pipes 40 may be extended or shortened according to the portion of the pipes 40 being unwound from or wound around the pipe fixing device 300.

Figure 2:
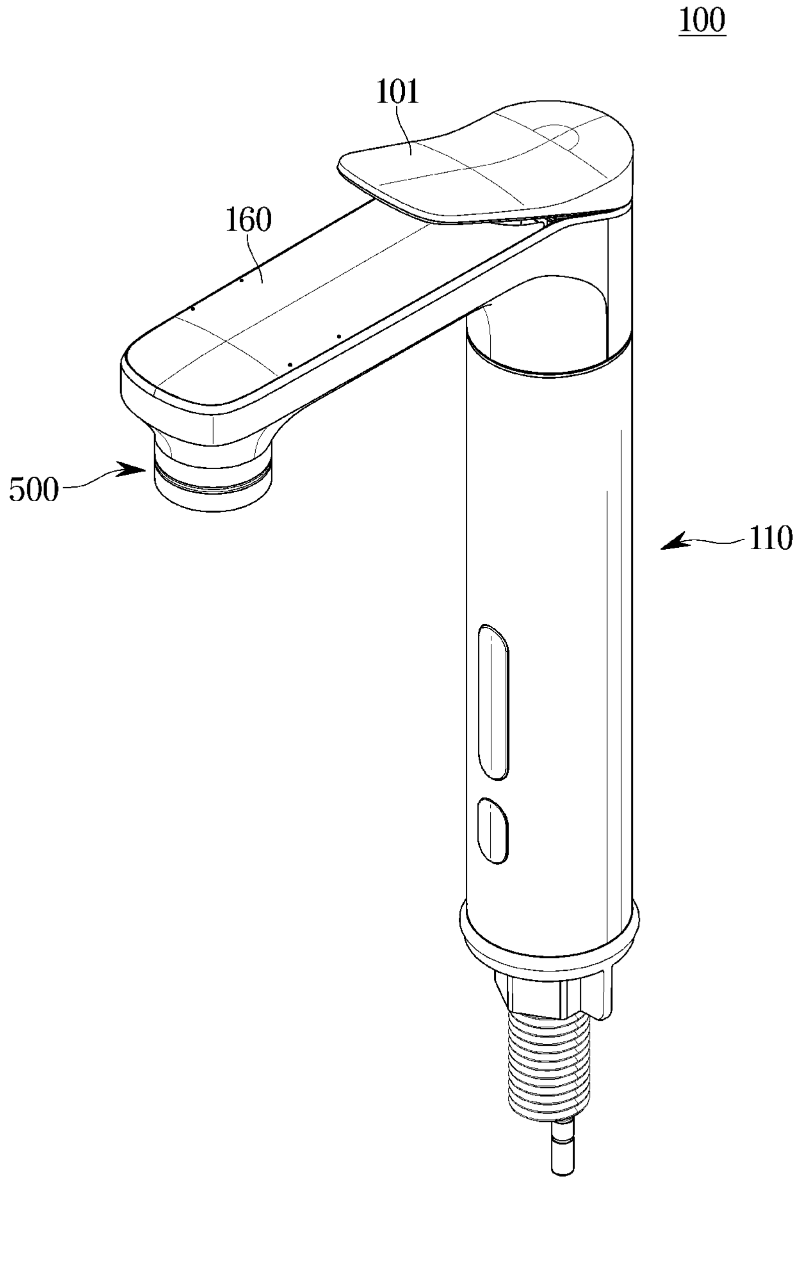
FIG. 2 is a perspective view of a water discharge unit illustrated in FIG. 1 according to an embodiment of the disclosure.
Figure 3:
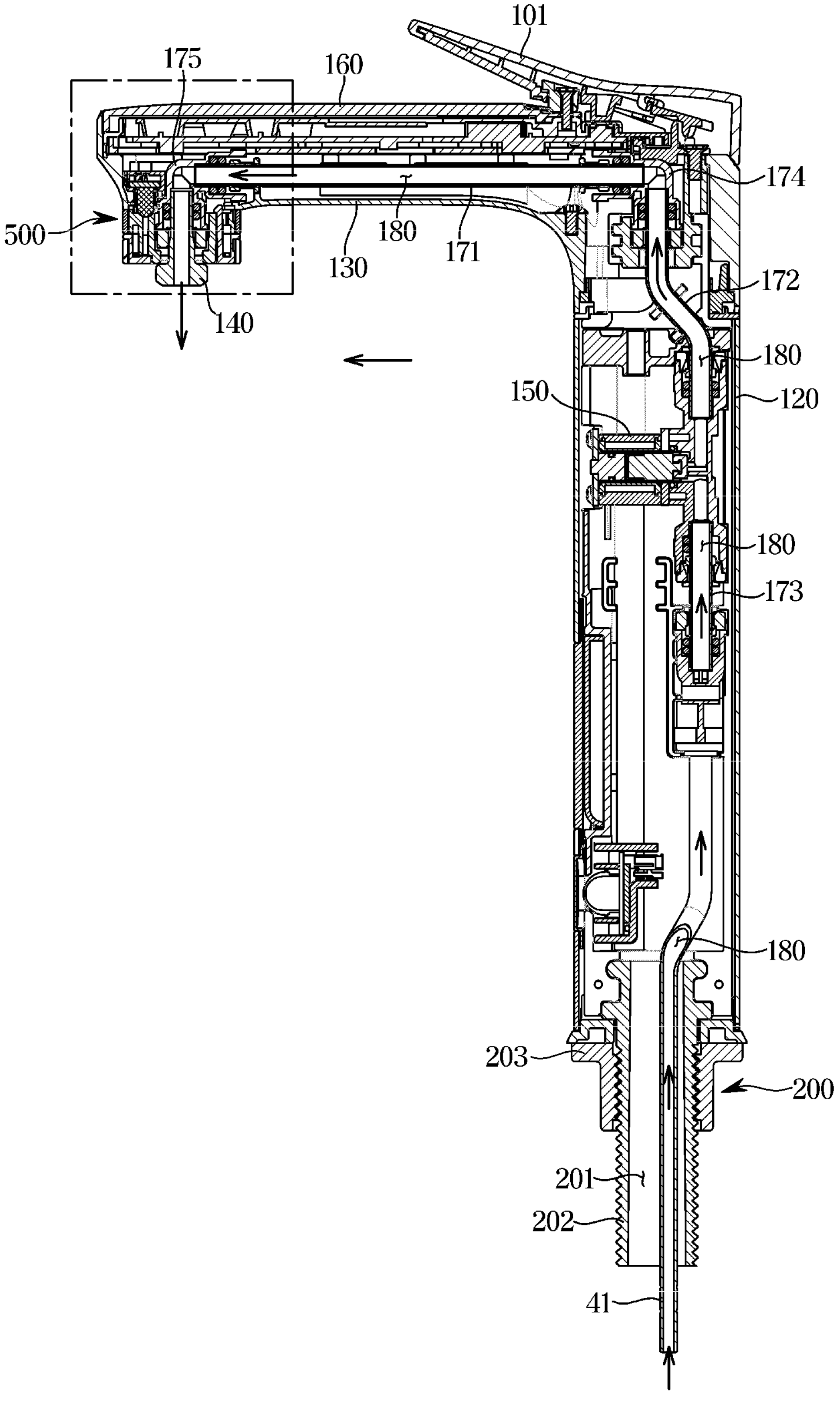
FIG. 3 is a lateral cross-sectional view of the water discharge unit illustrated in FIG. 2 according to an embodiment of the disclosure.
Figure 4:
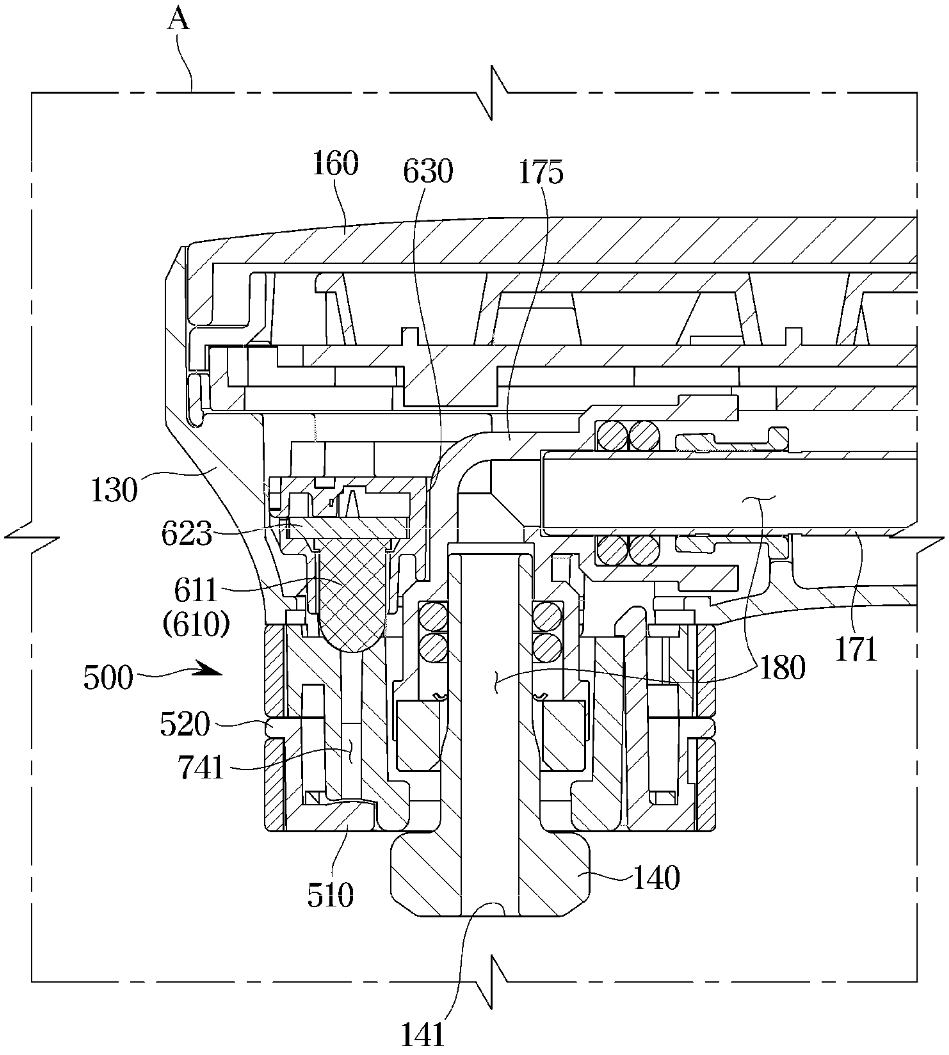
FIG. 4 is an enlarged view of portion A of FIG. 3 according to an embodiment of the disclosure.

FIG. 2 is a perspective view of the water discharge unit illustrated in FIG. 1. FIG. 3 is a lateral cross-sectional view of the water discharge unit illustrated in FIG. 2. FIG. 4 is an enlarged view of portion A of FIG. 3.

Referring to FIGS. 2 to 4, the water discharge unit 100 may include a body 110 forming an exterior and in which various parts may be disposed. The body 110 may be formed in a substantially L-shape. One side of the body 110 may be rotatably coupled to the kitchen cabinet 2. Specifically, the body 110 may include a neck housing 120 extending substantially upward and a head housing 130 extending substantially horizontal from an upper end of the neck housing 120, and a lower end of the neck housing 120 may be rotatably coupled to the kitchen cabinet 2 by the rotating device 200.

The neck housing 120 and the head housing 130 may be separately formed and coupled to each other, or the neck housing 120 and the head housing 130 may be integrally formed.

The neck housing 120 may be perpendicular to or tilted from one surface of the kitchen cabinet 2 on which the installation site 3 is formed.

The water discharge unit 100 may include a water discharge tube 140 disposed at the other end of the body 110 which is the opposite side of one end of the body 110 that is coupled to the kitchen cabinet 2. The water discharge tube 140 may be disposed at the other end of the head housing 130 which is the opposite side of one end of the head housing 130 that is connected to the neck housing 120. The water discharge tube 140 may form a water discharge hole 141 through which water is discharged to an outside of the water discharge unit 100. The water discharge tube 140 may extend in an up-down direction, and the water discharge hole 141 may be disposed at a lower portion of the other end of the body 110. Since the water discharge tube 140 may be fixed to the head housing 130, the position of the water discharge tube 140 may be changeable according to rotation of the body 110.

The water discharge unit 100 may include one or more pipes 171, 172, 173, 174, and 175 disposed inside the body 110. Water supplied by the water purifier main body 10 may flow inside the pipes 171, 172, 173, 174, and 175. The one or more pipes 171, 172, 173, 174, and 175 may form a water discharge flow path 180 to allow the water supplied by the water purifier main body 10 to flow. The pipes 171, 172, 173, 174, and 175 may be connected to the water discharge tube 140. The water discharge flow path 180 may communicate with the water discharge hole 141.

The one or more pipes 171, 172, 173, 174, and 175 may include first to third pipes 171, 172, and 173 and first and second elbow pipes 174 and 175. One end of the first pipe 173 may be connected to the first pipe 41 by a connector, and the other end of the first pipe 173 may be connected to a water discharge valve 150. One end of the second pipe 172 may be connected to the water discharge valve 150, and the other end of the second pipe 172 may be connected to the third pipe 171 by the first elbow pipe 174. The third pipe 171 may be connected to the water discharge tube 140 by the second elbow pipe 175. Two or more of the first pipe 173, the second pipe 172, the third pipe 171, the first elbow pipe 174, and the second elbow pipe 175 may be integrally formed. Meanwhile, the present disclosure is not limited thereto, and the first pipe 173 may be omitted, and the first pipe 41 may be directly connected to the water discharge valve 150.

The water discharge unit 100 may include the water discharge valve 150 configured to turn the water on or off. That is, the water discharge valve 150 may control whether water is discharged through the water discharge hole 141. The water discharge valve 150 may be disposed in the water discharge flow path 180. The water discharge valve 150 may regulate water flowing from the first pipe 173 to the second pipe 172. That is, the water discharge valve 150 may open and close the water discharge flow path 180. In other words, the water discharge valve 150 may selectively supply water to the inside of the pipes 171, 172, 174, and 175 disposed at the opposite side of the first pipe 41 relative to the water discharge valve 150.

The water discharge valve 150 may be disposed inside the body 110. The water discharge valve 150 may be disposed inside the neck housing 120.

The water discharge unit 100 may include a water discharge mechanism 101 configured to control the water discharge valve 150. The water discharge mechanism 101 may control the water discharge valve 150 to control whether water is discharged through the water discharge hole 141. The water discharge mechanism 101 may be made of a lever or a button.

The water discharge unit 100 may include a display 160 configured to receive a touch input and output an image. The display 160 may form an upper surface of the water discharge unit 100. Specifically, the head housing 130 may be open upward, and the display 160 may be coupled to the open upper end of the head housing 130 and cover an inner space of the head housing 130 in which various electronic parts are disposed.

The display 160 may be disposed above the water discharge tube 140. The display 160 may be disposed at the other end side of the head housing 130 which is the opposite side of the one end of the head housing 130 that is connected to the neck housing 120. The display 160 may extend a predetermined length from the other end of the head housing 130 toward the one end of the head housing 130.

The display 160 may be electrically connected to the water purifier main body 10 by an electric wire or may be wirelessly connected to the water purifier main body 10. The display 160 may receive a user's touch input for selecting a desired type of water and/or a user's touch input for selecting the amount of water discharged through the water discharge hole 141 and may transmit an input signal corresponding to the received touch input to the water purifier main body 10. The water purifier main body 10 which has received the input signal from the display 160 may supply the selected type of water to the water discharge unit 100 according to the input signal or control the amount of water supplied to the water discharge unit 100 according to the input signal.

For example, selecting the amount of discharged water may be selecting one of 120 ml, 500 ml, 1,000 ml, and continuous water discharge. The continuous water discharge may refer to a state in which water is continuously discharged until the user operates the water discharge mechanism 101 to turn off the water.

Meanwhile, water discharged through the water discharge hole 141 may be classified into purified water, cold water, and hot water according to whether the water is cooled or heated. The purified water may refer to water supplied to the water discharge unit 100 without separately cooling or heating raw water filtered by the filter 21. The cold water may refer to water supplied to the water discharge unit 100 after raw water filtered by the filter 21 is cooled by the heat exchange unit 30. The hot water may refer to water supplied to the water discharge unit 100 after raw water filtered by the filter 21 is heated by the heat exchange unit 30. That is, the purified water, cold water, and hot water may correspond to water of different temperatures. Among the cold water, purified water, and hot water, the temperature of the cold water is the lowest, the temperature of the hot water is the highest, and the temperature of the purified water is higher than the temperature of the cold water and lower than the temperature of the hot water. Accordingly, selecting the type of water may correspond to selecting any one of the purified water, cold water, and hot water classified based on temperature.

However, the present disclosure is not limited thereto. For example, water discharged from the water discharge unit 100 may be classified based on chemical configuration such as the concentration of a specific ion or based on state of matter, and selecting the type of water may correspond to selecting any one of various types of water classified based on such factors.

The display 160 may output an image button to allow the user to input a selection of the purified water, cold water, or hot water or input a selection of the amount of discharged water. The user may touch an area of the display 160 where the image button appears and operate the water purifier main body 10.

The water discharge unit 100 may include the rotating device 200 configured to rotatably fix the body 110 to the installation site 3. The rotating device 200 may include a cylindrical rotary bracket 202 having one end rotatably coupled to the lower end of the neck housing 120 and having a through-hole 201 through which the first pipe 41 passes formed therein and a fixing member 203 into which the rotary bracket 202 is inserted to be fixed. Specifically, screw threads may be formed on an outer side surface of the rotary bracket 202, and in a state in which the rotary bracket 202 passes through the installation site 3, the fixing member 203 may be, like a nut, screw-coupled to a portion of the rotary bracket 202 passing through the installation site 3.

The water discharge unit 100 may include a display device 500 configured to, by using light, provide information on water discharged from the water discharge tube 140.

The display device 500 may include a first indicator 510 configured to indicate a position of water discharge and a second indicator 520 configured to indicate a selection made by the user. The first indicator 510 and the second indicator 520 may be disposed adjacent to the water discharge tube 140.

The first indicator 510 may indicate a position at which water is discharged from the water discharge tube 140 in a state in which the water discharge tube 140 is moved to a specific position according to rotation of the body 110 (or "position of water discharge"). The selection made by the user that is indicated by the second indicator 520 may be the type of water. The second indicator 520 may indicate which of the purified water, cold water, and hot water the user has selected.

The display device 500 may surround and cover an outer peripheral surface of the water discharge tube 140. In other words, the water discharge tube 140 may be inserted into substantially the center of the display device 500. Here, one end of the second elbow pipe 175 that is coupled to the water discharge tube 140 may also be inserted into the display device 500.

The position of the display device 500 may be changed along with the position of the water discharge tube 140 according to rotation of the body 110. The first indicator 510 may be formed on a lower surface of the display device 500, and the second indicator 520 may be formed in an annular shape on an outer peripheral surface of the display device 500.

The first indicator 510 may radiate light to a portion under the water discharge tube 140 to form an image under the water discharge tube 140. Specifically, the first indicator 510 may form an image on a surface of one area of the kitchen cabinet 2 that is positioned under the water discharge hole 141. The user may intuitively identify the position of water discharge by looking at the image formed by the first indicator 510 and may place a container at the position where the image is formed and fill the container with water.

The second indicator 520 may emit light to the outer peripheral surface of the display device 500. The second indicator 520 may emit light of a color corresponding to the selection made by the user, and the user may, by looking at the color of light emitted by the second indicator 520, check information on water discharged based on his or her selection. For example, in a case in which cold water is being discharged, the second indicator 520 may emit light of a first color, in a case in which hot water is being discharged, the second indicator 520 may emit light of a second color, and in a case in which purified water is being discharged, the second indicator 520 may emit light of a third color. The first to third colors may be different colors.

Figure 5:
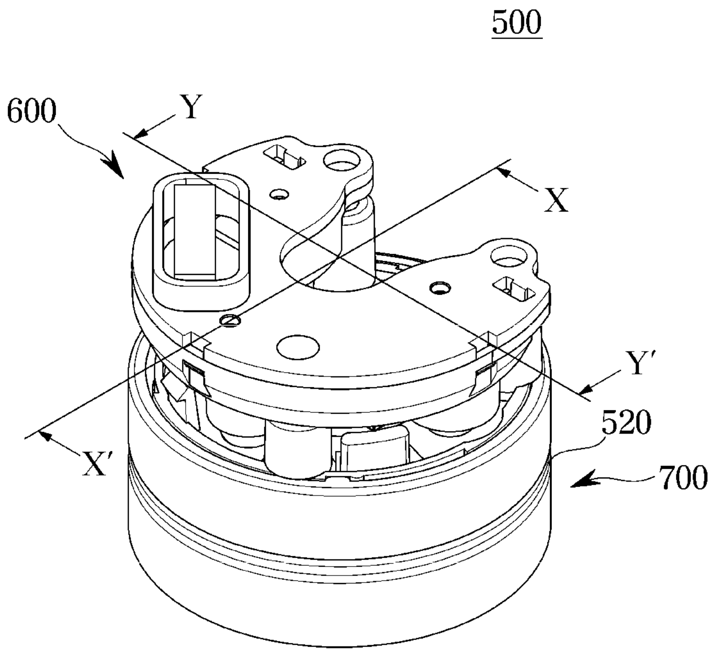
FIG. 5 is a perspective view of a display device illustrated in FIG. 2 according to an embodiment of the disclosure.
Figure 6:
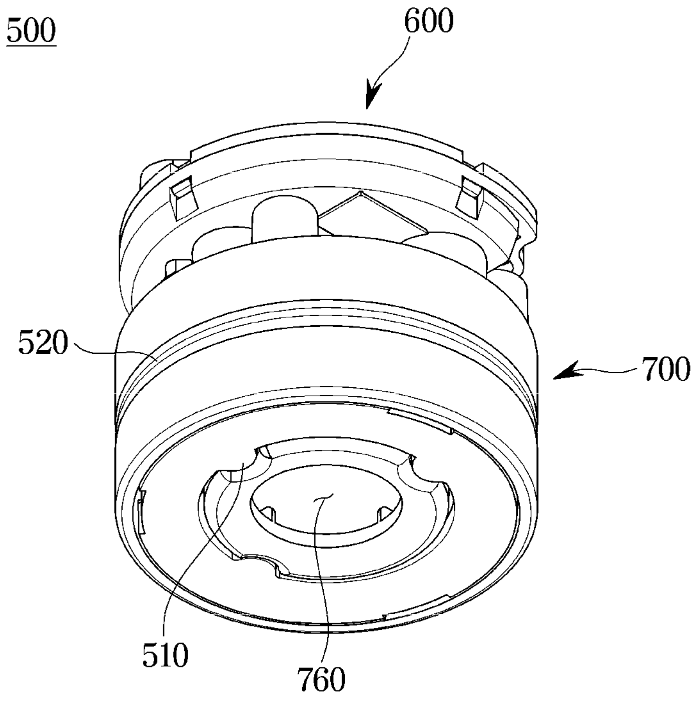
FIG. 6 is a bottom perspective view of the display device illustrated in FIG. 2 according to an embodiment of the disclosure.
Figure 7:
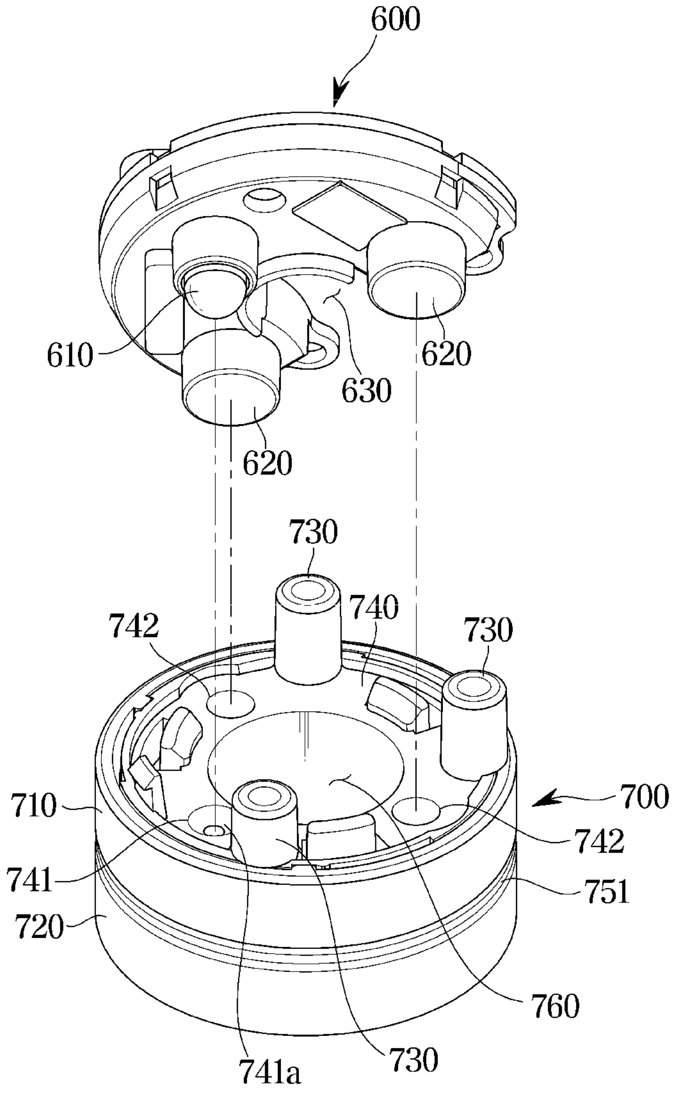
FIG. 7 is an exploded view of a light source module and a guide assembly in the display device illustrated in FIG. 5 according to an embodiment of the disclosure.
Figure 8:
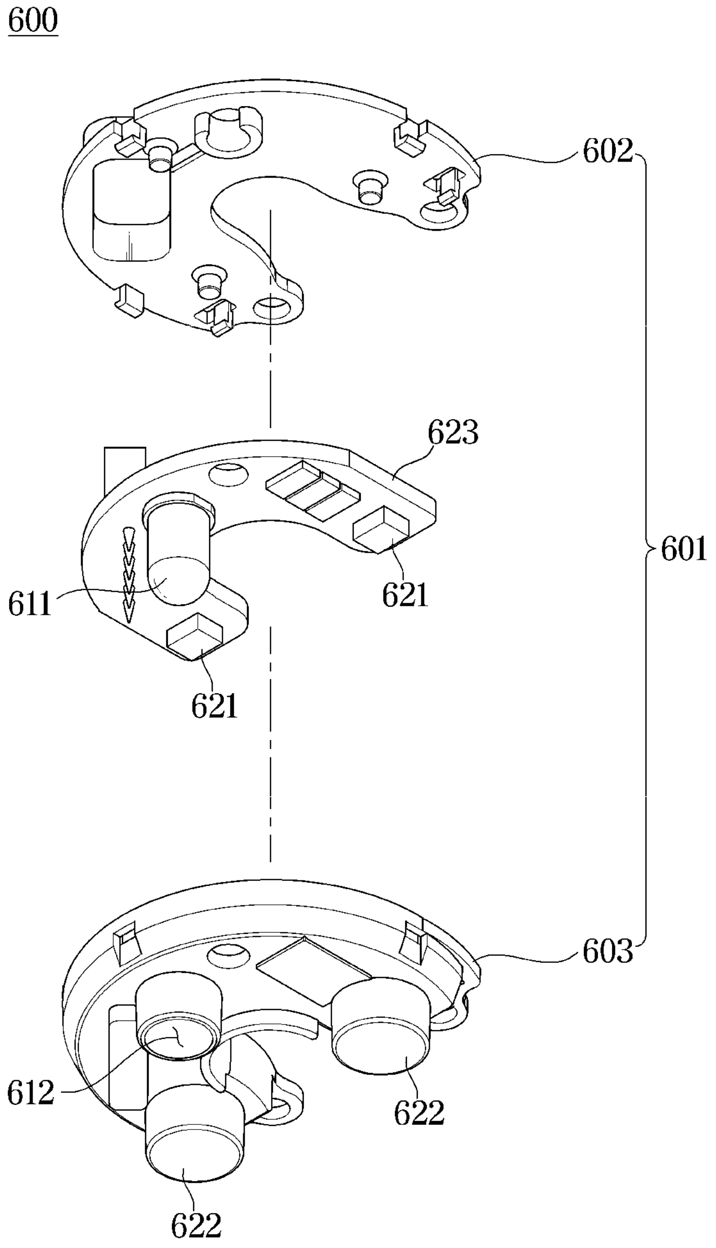
FIG. 8 is an exploded view of the light source module illustrated in FIG. 7 according to an embodiment of the disclosure.
Figure 9:
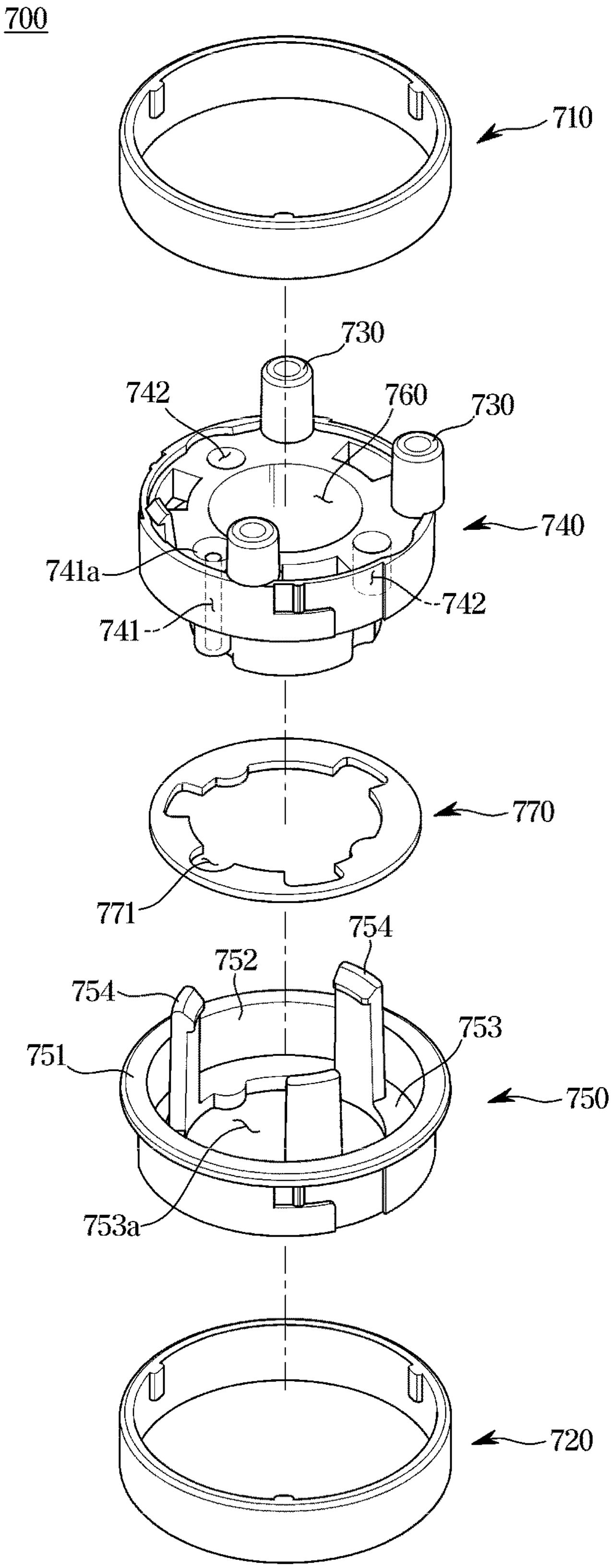
FIG. 9 is an exploded view of the guide assembly illustrated in FIG. 7 according to an embodiment of the disclosure.
Figure 10:
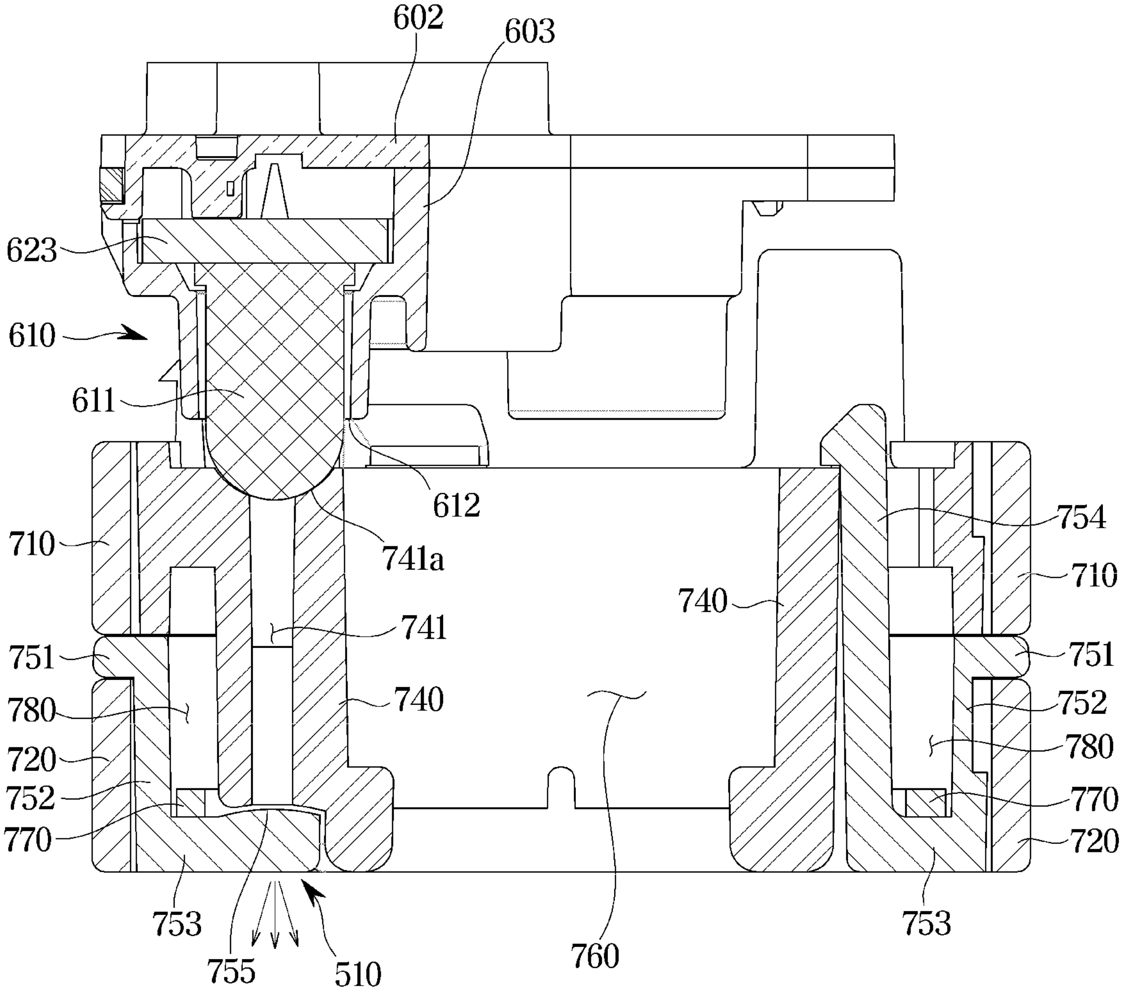
FIG. 10 is a cross-sectional view taken along line X-X' of FIG. 5 according to an embodiment of the disclosure.
Figure 11:
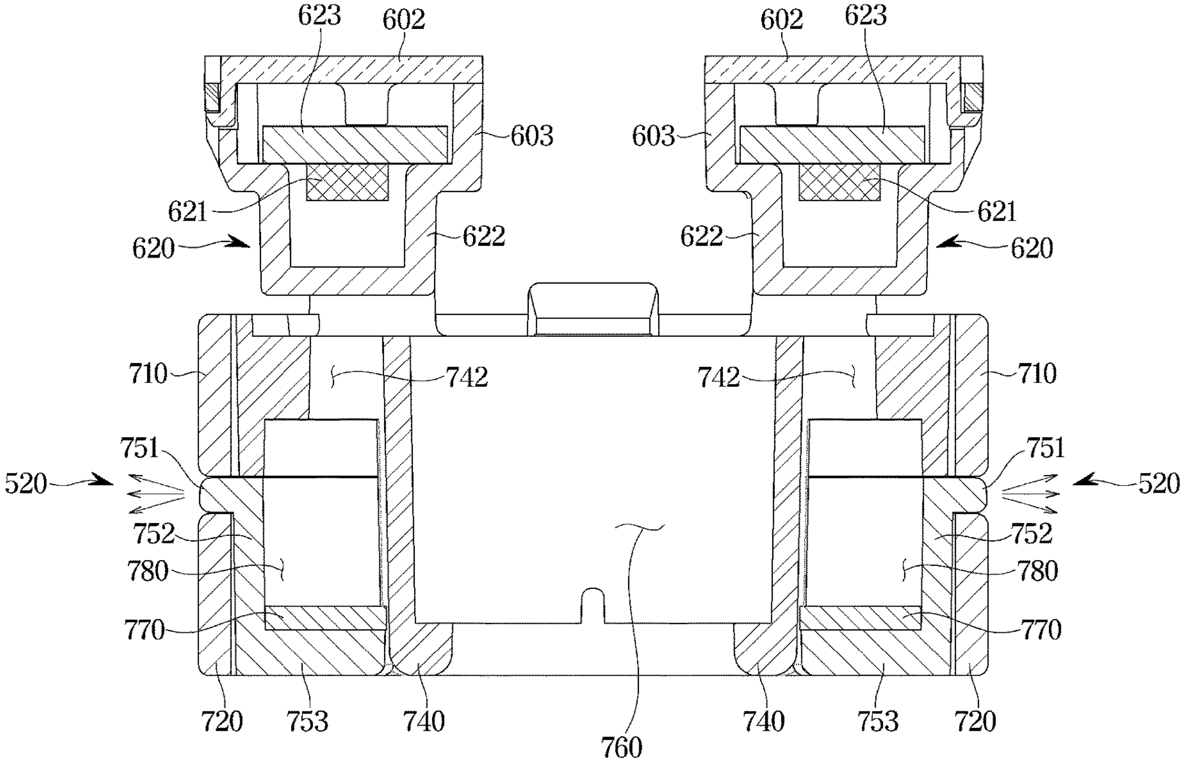
FIG. 11 is a cross-sectional view taken along line Y-Y' of FIG. 5 according to an embodiment of the disclosure.

FIG. 5 is a perspective view of a display device illustrated in FIG. 2. FIG. 6 is a bottom perspective view of the display device illustrated in FIG. 2. FIG. 7 is an exploded view of a light source module and a guide assembly in the display device illustrated in FIG. 5. FIG. 8 is an exploded view of the light source module illustrated in FIG. 7. FIG. 9 is an exploded view of the guide assembly illustrated in FIG. 7. FIG. 10 is a cross-sectional view taken along line X-X' of FIG. 5. FIG. 11 is a cross-sectional view taken along line Y-Y' of FIG. 5.

Referring to FIGS. 5 to 11, the display device 500 may include a light source module 600 including a plurality of light sources 610 and 620 and a guide assembly 700 configured to guide light emitted from the light source module 600.

The light source module 600 may be disposed above the guide assembly 700. The light source module 600 may be coupled to the guide assembly 700. Specifically, the guide assembly 700 may include a supporter 730 configured to protrude upward from an upper surface of a guide case 740 and support a housing 601 of the light source module 600, and the light source module 600 may be fixed to the supporter 730 by a fastening member such as a pin, a screw, or a bolt. The light source module 600 may be disposed inside the head housing 130. The light source module 600 may be disposed so that the plurality of light sources 610 and 620 are adjacent to the water discharge tube 140. The light source module 600 may form a seating groove 630 on which the second elbow pipe 175 is seated.

The plurality of light sources of the light source module 600 may include a first light source 610 and a pair of second light sources 620. The first light source 610 and the second light sources 620 may be spaced apart from each other. The first light source 610 and the second light sources 620 may be disposed to face the guide assembly 700.

The first light source 610 and the second light sources 620 may emit light downward. The second light sources 620 may emit light in a plurality of colors. For example, the second light sources 620 may selectively emit light in any one of a first color, a second color, and a third color and may emit light in any one color and change the color of the light. However, the present disclosure is not limited thereto, and the second light sources 620 may emit light in two different colors or emit light in four or more different colors.

The first light source 610 may include a first light emitting diode (LED) 611. Each of the second light sources 620 may include a second LED 621 configured to emit light in a plurality of colors. The second LED 621 may correspond to a RGB LED.

The light source module 600 may include the housing 601 configured to accommodate therein a printed circuit board 623 on which the first and second LEDs 611 and 621 are mounted. The housing 601 may include an upper housing 602 configured to form an upper surface of the light source module 600 and a lower housing 603 configured to form a lower surface of the light source module 600. The upper housing 602 may be coupled to an upper end of the lower housing 603. However, the present disclosure is not limited thereto, and the upper housing 602 and the lower housing 603 may be integrally formed.

The lower housing 603 may include a through-hole 612 provided to correspond to the first LED 611 and allow the first LED 611 to pass therethrough, and covers 622 each configured to correspond to one of the second LEDs 621 and cover one of the second LEDs 621. The lower housing 603 may be formed of a substantially transparent material or formed of a semitransparent material. As the first LED 611 is inserted into the through-hole 612, the first light source 610 may be formed accordingly, and as the second LEDs 621 are covered by the covers 622, the second light sources 620 may be formed accordingly.

The guide assembly 700 may be disposed under the light source module 600 and form an exterior of the water discharge unit 100.

The guide assembly 700 may include the guide case 740 configured to form a hollow portion 760 through which the water discharge tube 140 passes and guide light of the first light source 610 and light of the second light source 620 in one direction to prevent the rays of light from being mixed with each other. Specifically, the guide case 740 may guide the light of the first light source 610 and the light of the second light source 620 downward in a direction parallel to the direction in which the water discharge tube 140 extends while preventing the rays of light from being mixed with each other.

The guide case 740 may surround and cover the outer peripheral surface of the water discharge tube 140. The guide case 740 may be formed of a material such as a metal (e.g., aluminum), a synthetic resin, or the like.

The guide case 740 may include a first guide hole 741 configured to guide the light of the first light source 610 downward and a second guide hole 742 configured to guide the light of the second light source 620 downward. The first guide hole 741 and the second guide hole 742 may pass through upper and lower surfaces of the guide case 740. The light of the first light source 610 may be introduced through an upper end of the first guide hole 741. The light of the second light source 620 may be introduced through an upper end of the second guide hole 742. The light of the first light source 610 may be emitted through a lower end of the first guide hole 741. The light of the second light source 620 may be emitted through a lower end of the second guide hole 742. The first guide hole 741 and the second guide hole 742 may be spaced apart and separated from each other. The first guide hole 741 may be disposed at a position corresponding to the first light source 610. The second guide hole 742 may be disposed at a position corresponding to the second light source 620. The second guide hole 742 may include a pair of second guide holes 742 each disposed at a position corresponding to one of the pair of second light sources 620.

The guide case 740 may include a leakage reducing curved surface **741*a* formed on the upper end of the first guide hole 741 to allow the first light source 610 to be seated thereon and configured to reduce leakage of the light of the first light source 610. The leakage reducing curved surface 741*a* may be formed in a shape corresponding to one surface of the first LED 611 that has a curved shape. The leakage reducing curved surface 741*a* may come in contact with the surface of the first LED 611 having the curved shape, and the leakage reducing curved surface 741*a* in contact with the surface of the first LED 611 may reflect light emitted to a space other than the first guide hole 741 back to the first LED 611 to cause most of the light emitted from the first LED 611 to be incident on the first guide hole 741. However, the present disclosure is not limited thereto, and the leakage reducing curved surface 741***a* may be omitted, and one area of an upper surface of the guide case 740 that is connected to the first guide hole 741 may be flat like other portions of the upper surface of the guide case 740.

The guide assembly 700 may include a light guide cover 750 on which light guided by the guide case 740 is incident. The light guide cover 750 may cover the first guide hole 741 and the second guide hole 742. The light guide cover 750 may be formed of a substantially transparent material. The light guide cover 750 may be formed of plastic, acryl, glass, or the like in order to be substantially transparent.

The light guide cover 750 may be coupled to the guide case 740. Specifically, the light guide cover 750 may include a coupling hook 754 configured to extend upward from a bottom wall portion 753, and as the coupling hook 754 is fastened to the guide case 740, the light guide cover 750 may be coupled to the guide case 740.

The light guide cover 750 may include the bottom wall portion 753 configured to form a lower surface of the guide assembly 700 that corresponds to the lower surface of the display device 500, a sidewall portion 752 configured to protrude upward from an outer periphery of the bottom wall portion 753, and a light-emitting rib 751 configured to extend in a radial direction of the sidewall portion 752 and/or a radial direction of the water discharge tube 140 from an outer peripheral surface of the sidewall portion 752. The light guide cover 750 may project the light of the second light source 620 guided by the guide case 740 in the radial direction of the sidewall portion 752 and/or the radial direction of the water discharge tube 140 through the light-emitting rib 751.

The bottom wall portion 753 may be formed in a substantially annular shape with an open central portion to form an opening 753*a* at a position corresponding to the hollow portion 760. The sidewall portion 752 extending upward from the outer periphery of the bottom wall portion 753 may be formed in a cylindrical shape. The light-emitting rib 751 extending in the radial direction from the outer peripheral surface of the sidewall portion 752 may be formed in a substantially annular shape. Accordingly, the water discharge tube 140 may pass through the light guide cover 750, and the light guide cover 750 may surround and cover the outer peripheral surface of the water discharge tube 140. A lower end of the guide case 740 may be inserted into and coupled to the opening 753*a* of the central portion of the bottom wall portion 753.

The bottom wall portion 753 may cover or block the lower end of the first guide hole 741. The light of the first light source 610 guided by the first guide hole 741 may be incident on the bottom wall portion 753, and the light guide cover 750 may project the light of the first light source 610 that has passed through the bottom wall portion 753 to a portion under the water discharge tube 140. Here, one area of the bottom wall portion 753 from which the light of the first light source 610 is projected may correspond to the first indicator 510.

Meanwhile, the light guide cover 750 may include a lens 755 formed on the bottom wall portion 753 to be disposed at a position corresponding to the first guide hole 741 and configured to condense the light of the first light source 610 that is guided by the first guide hole 741. The lens 755 may include a convex lens. The light guide cover 750 may project the light of the first light source 610, which is condensed while passing through the lens 755, to the portion under the water discharge tube 140. However, the present disclosure is not limited thereto, and the lens 755 may be omitted.

The light guide cover 750 may project the light of the second light source 620 to the outer peripheral surface of the display device 500. Hereinafter, the process in which the light of the second light source 620 is guided to the outer peripheral surface of the display device 500 will be described.

The guide assembly 700 may include a diffusion space 780 formed between the light guide cover 750 and the guide case 740. The diffusion space 780 may correspond to a separation space between the light guide cover 750 and the guide case 740. The diffusion space 780 may form a closed loop that surrounds the water discharge tube 140. A bottom surface of the diffusion space 780 may be formed by the bottom wall portion 753, and at least a portion of an outer peripheral surface of the diffusion space 780 may be formed by the sidewall portion 752. An inner peripheral surface of the diffusion space 780 may be formed by the guide case 740.

In order to prevent the light of the first light source 610 guided by the first guide hole 741 from leaking to the diffusion space 780, the diffusion space 780 may be partitioned from the first guide hole 741. The diffusion space 780 may communicate with the second guide hole 742. The lower end of the second guide hole 742 may be connected to the diffusion space 780. In other words, since the first guide hole 741 may be partitioned from the diffusion space 780 and extend downward from the upper surface of the guide case 740 until the lower end of the first guide hole 741 touches the bottom wall portion 753, and the second guide hole 742 may extend downward from the upper surface of the guide case 740 until the lower end of the second guide hole 742 is connected to the diffusion space 780 disposed above the bottom wall portion 753, a length at which the first guide hole 741 extends in the up-down direction may be longer than a length at which the second guide hole 742 extends in the up-down direction. The length at which the first guide hole 741 extends in the up-down direction may be substantially longer than or equal to a sum of the length at which the second guide hole 742 extends in the up-down direction and a height of the diffusion space 780 in the up-down direction.

The light of the second light source 620 guided by the second guide hole 742 may be incident on the diffusion space 780. The light of the second light source 620 guided by the second guide hole 742 may be diffused and/or irregularly reflected from the diffusion space 780 and incident on an inner peripheral surface of the sidewall portion 752.

The light-emitting rib 751 connected to the sidewall portion 752 may be exposed to the outer peripheral surface of the display device 500. That is, the light-emitting rib 751 may be exposed to the outer peripheral surface of the guide assembly 700. Specifically, the guide assembly 700 may include first and second deco plates 710 and 720 configured to form an exterior of the display device 500, and the light-emitting rib 751 may be disposed between the first deco plate 710 and the second deco plate 720 in the up-down direction in order to be exposed to the outer peripheral surface of the display device 500 while forming the exterior of the display device 500.

The light of the second light source 620 incident on the inner peripheral surface of the sidewall portion 752 may be guided to the light-emitting rib 751 and projected from the light-emitting rib 751 to the outside of the display device

500. Here, one area of the light-emitting rib 751 that is exposed to the outside of the display device 500 may correspond to the second indicator 520.

The first and second deco plates 710 and 720 may extend in a direction toward an outer periphery of the guide assembly 700. The first and second deco plates 710 and 720 may each be formed in an annular shape to form the outer peripheral surface of the display device 500. The guide case 740 may be inserted into the first deco plate 710, and the first deco plate 710 may be coupled to an outer peripheral surface of the guide case 740. The light guide cover 750 may be inserted into the second deco plate 720, and the second deco plate 720 may be coupled to the outer peripheral surface of the sidewall portion 752 of the light guide cover 750.

The guide assembly 700 may include a light shielding member 770 disposed on an upper surface of the bottom wall portion 753 and provided to prevent the light of the second light source 620 from being projected through the bottom wall portion 753. The light shielding member 770 may be provided in a shape that corresponds to the bottom wall portion 753. The light shielding member 770 may be formed in a substantially annular shape. The light shielding member 770 may include a cut-out portion 771 formed at a position corresponding to the lower end of the first guide hole 741 in order to prevent the lower end of the first guide hole 741 from being covered by the light shielding member 770.

The light shielding member 770 may reflect light heading toward the bottom wall portion 753, among the rays of light of the second light source 620 entering the diffusion space 780, back to the diffusion space 780 or absorb the light to prevent the light of the second light source 620 from passing through the bottom wall portion 753. However, the present disclosure is not limited thereto, and the light shielding member 770 may be omitted.

In this way, the display device 500 may implement the plurality of indicators 510 and 520, which may be independently operated, into a single device to reduce the size of the product and reduce manufacturing costs and may prevent the rays of light of the plurality of light sources 610 and 620, which are used in the indicators 510 and 520, from being mixed with each other or leaking to unnecessary areas so that pieces of information that the indicators 510 and 520 indicate can be more clearly delivered to the user.

Figure 12:
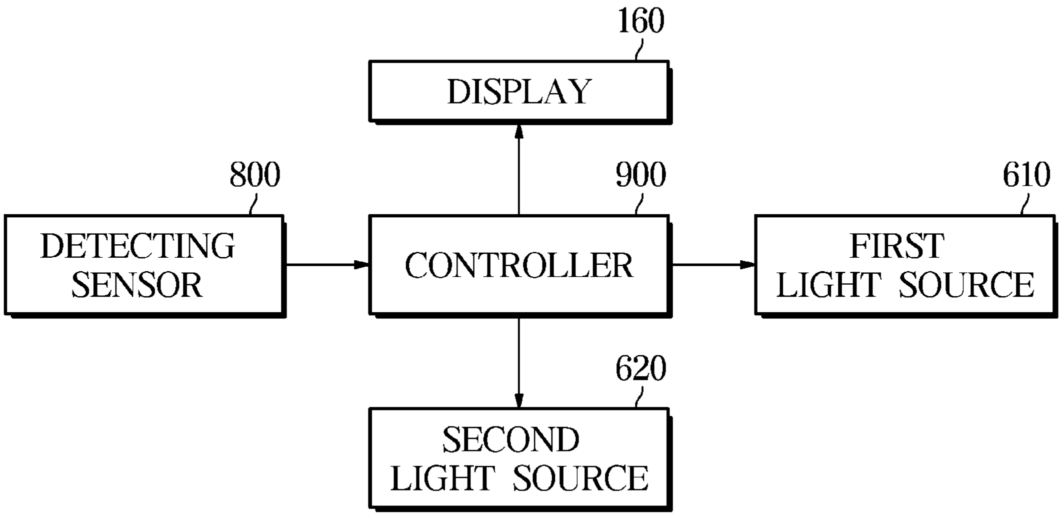
FIG. 12 is a control block diagram of the water purifier illustrated in FIG. 1 according to an embodiment of the disclosure.
Figure 13:
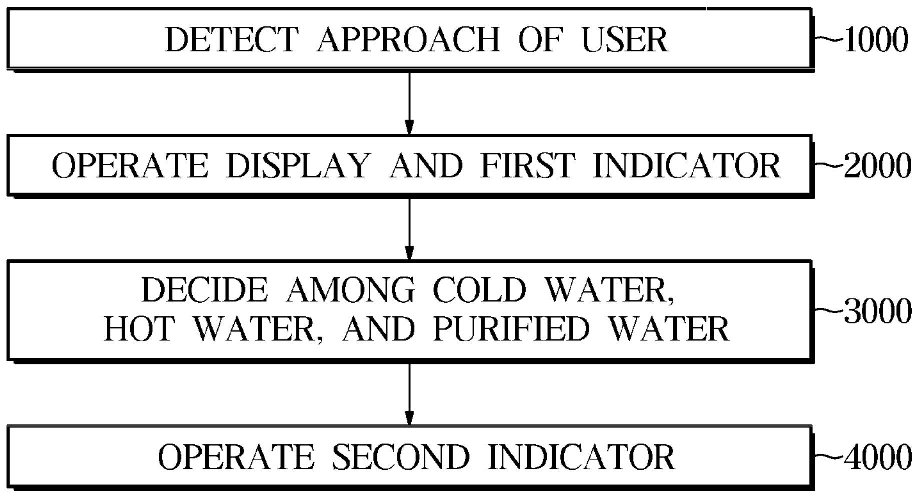
FIG. 13 is a flowchart of a control method of the water purifier illustrated in FIG. 1 according to an embodiment of the disclosure.

FIG. 12 is a control block diagram of the water purifier illustrated in FIG. 1. FIG. 13 is a flowchart of a control method of the water purifier illustrated in FIG. 1.

The order of operation of the display device will be described with reference to FIGS. 12 and 13.

The water discharge unit 100 may include a detecting sensor 800 configured to detect a user approaching the water discharge unit 100. The detecting sensor 800 may transmit a detection signal to a controller 900 in a case in which the user approaches the water discharge unit 100 within a predetermined distance.

The water discharge unit 100 may include the controller 900. The controller 900 may be disposed inside the water discharge unit 100 or disposed in the water purifier main body 10. The controller 900 may be electrically connected to the first light source 610 and the second light sources 620. The controller 900 may control the first light source 610 and the second light sources 620. Specifically, the controller 900 may turn the first LED 611 and the second LEDs 621 on and off and may set a color of the light emitted by the second LEDs 621. Also, the controller 900 may control the on and off of the display 160.

In a case in which a user approaches the water discharge unit 100 in order to use the water purifier 1, the detecting sensor 800 may detect the approach and transmit a detection signal to the controller 900 (1000).

The controller 900 which has received the detection signal may operate the display 160 and the first indicator 510. Specifically, the controller 900 which has received the detection signal may operate the display 160 and the first LED 611 (2000).

In response to the first indicator 510 being operated, the user may place a container at a position indicated by the first indicator 510 and operate the display 160 to select the type of water (3000). Specifically, one of cold water, hot water, and purified water may be selected. Also, the user may operate the display 160 to select the amount of discharged water.

When the user operates the water discharge mechanism 101 after selecting one of the cold water, hot water, and purified water and the amount of discharged water, the water discharge unit 100 may discharge water reflecting the selections made by the user. While water is being discharged through the water discharge hole 141, the controller 900 may operate the second indicator 520 so that the second indicator 520 emits light of a color corresponding to the selections made by the user (4000). Specifically, the controller 900 may operate the second LEDs 621 to emit light of a color corresponding to the selections made by the user. For example, the controller 900 may cause the second LEDs 621 to emit light of a first color while cold water is being discharged, cause the second LEDs 621 to emit light of a second color while hot water is being discharged, and cause the second LEDs 621 to emit light of a third color while purified water is being discharged.

In a case in which the water discharge unit 100 has completed supplying water by as much as the amount of discharged water selected by the user or the user has operated the water discharge mechanism 101 to turn off the water, the controller 900 may turn off the first indicator 510 and the second indicator 520. Specifically, the controller 900 may turn off the first LED 611 and the second LEDs 621.

Embodiments of the present disclosure may provide a water discharge unit for a water purifier, the water discharge unit including a body; a water discharge tube disposed at one side of the body and through which water is discharged; first and second light sources disposed inside the body and adjacent to the water discharge tube; a guide case configured to guide light emitted from the first and second light sources in a direction in which the water discharge tube extends; and a light guide cover coupled to the guide case and configured to guide the light of the first and second light sources guided by the guide case, wherein the light guide cover is provided to project the light of the first light source in the direction in which the water discharge tube extends and project the light of the second light source in a radial direction of the water discharge tube.

The light of the first light source may indicate a position of water discharge, and the light of the second light source may indicate which of purified water, cold water, and hot water is selected.

The guide case may include a first guide hole provided to allow the light of the first light source to pass therethrough and a second guide hole spaced apart from the first guide hole and provided to allow the light of the second light source to pass therethrough, and the light guide cover may include a bottom wall portion configured to transmit the light of the first light source that has passed through the first guide hole, a sidewall portion configured to protrude from an outer peripheral side of the bottom wall portion and allow the light of the second light source that has passed through the second guide hole to be incident thereon, and a light-emitting rib connected to the sidewall portion and configured to extend in the radial direction of the water discharge tube.

The light guide cover may include a lens provided on the bottom wall portion to be disposed at a position corresponding to the first guide hole and configured to condense the light of the first light source that is guided by the first guide hole.

The guide case may include a leakage reducing curved surface formed on one end of the first guide hole to allow the first light source to be seated thereon and configured to reduce leakage of the light of the first light source.

Specific embodiments illustrated in the drawings have been described above. However, the present disclosure is not limited to the embodiments described above, and those of ordinary skill in the art to which the disclosure pertains may make various changes thereto without departing from the gist of the technical spirit of the disclosure defined in the claims below.

What is claimed is:

1. A water purifier comprising:
a main body arrangeable in a lower space of a cabinet; and
a water discharge unit connected to the main body so that, when the main body is arranged in the lower space of the cabinet, at least a portion of the water discharge unit is exposed to an upper side of the cabinet, and purified water, cold water, and hot water are selectably dischargeable through the water discharge unit,
wherein the water discharge unit includes:
a body configured to be rotatable,
a water discharge tube having a position that is changeable according to rotation of the body, and
a display device including:
a first light source,
a second light source,
a light guide cover, and
a guide case configured to guide light emitted from the first light source and light emitted from the second light source so as to be incident on the light guide cover, and to prevent the light emitted from the first light source from being mixed with the light emitted from the second light source,
wherein the light guide cover is configured to:
project the light emitted from the first light source and incident on the light guide cover in a direction of water discharge from the water discharge tube to indicate the direction of water discharge, and
project the light emitted from the second light source and incident on the light guide cover toward an outer peripheral surface of the display device to indicate which of purified water, cold water, and hot water is selected.

2. The water purifier of claim 1, wherein
the guide case and the light guide cover surround the water discharge tube.

3. The water purifier of claim 2, wherein
the guide case includes:
a first guide hole configured to guide the light emitted from the first light source so as to be incident on the light guide cover, and
a second guide hole spaced apart from the first guide hole and configured to guide the light emitted from the second light source so as to be incident on the light guide cover.

4. The water purifier of claim 3, wherein
the light guide cover includes a bottom wall portion configured to form a lower surface of the display device and cover a lower end of the first guide hole, and
the light emitted from the first light source guided by the first guide hole and incident on the light guide cover passes through the bottom wall portion and is projected in the direction of water discharge.

5. The water purifier of claim 4, wherein
the light guide cover includes a lens provided on the bottom wall portion at a position corresponding to the first guide hole and configured to condense the light emitted from the first light source and incident on the light guide cover that is guided by the first guide hole.

6. The water purifier of claim 4, wherein
the display device further includes a light shielding member disposed on the bottom wall portion to prevent the light emitted from the second light source and incident on the light guide cover from passing through the bottom wall portion.

7. The water purifier of claim 3, wherein
the display device includes:
a diffusion space formed between the guide case and the light guide cover, and partitioned from the first guide hole, the diffusion space being configured to communicate with the second guide hole, and
the light guide cover includes:
a sidewall portion having an inner peripheral surface configured to form the diffusion space, and
a light-emitting rib configured to protrude from an outer peripheral surface of the sidewall portion so as to be exposed to the outer peripheral surface of the display device.

8. The water purifier of claim 7, wherein
the light guide cover projects the light emitted from the second light source, which is guided to the diffusion space and is incident on an inner peripheral surface of the light guide cover, through the light-emitting rib.

9. The water purifier of claim 3, wherein
the guide case includes a leakage reducing curved surface formed on an upper end of the first guide hole to allow the first light source to be seated in the leakage reducing curved surface, and configured to reduce leakage of the light emitted from the first light source.

10. The water purifier of claim 2, wherein
the water discharge unit further includes:
a detecting sensor configured to detect an approach of a user, and
a controller configured to control the detecting sensor, the first light source, and the second light source, and
in response to the detecting sensor detecting the approach of the user, the controller turns on the first light source.

11. The water purifier of claim 10, wherein
the second light source emits rays of light of a plurality of different colors, and
in response to any one of the purified water, cold water, and hot water being selected, the controller controls the second light source to emit light of a color, among the plurality of different colors, corresponding to the selection of any one of the purified water, cold water, and hot water.

12. The water purifier of claim 11, wherein
the water discharge unit includes a display configured to output an image, and
in response to the detecting sensor detecting the approach of the user, the controller turns on the display as well as the first light source.

13. The water purifier of claim 1, wherein the light guide cover includes a coupling hook extending upward so as to be fastenable to the guide case to couple the light guide cover to the guide case.

14. The water purifier of claim 1, wherein the guide case forms a hollow portion through which the water discharge tube passes.

15. The water purifier of claim 1, wherein the cabinet includes a sink, and when the main body is arranged in the lower space of the cabinet, the body of the water discharge unit is couplable to the sink so as to be rotatable.

* * * * *